United States Patent
Kim

[19]

[11] Patent Number: 5,917,786
[45] Date of Patent: Jun. 29, 1999

[54] REDUCED SIZE AUTOMATIC LOADING DISC CHANGER

[75] Inventor: Ko-hyun Kim, Chungcheongbuk-do, Rep. of Korea

[73] Assignee: Samsung Electronics Co., Ltd., Kyungki-Do, Rep. of Korea

[21] Appl. No.: 08/693,775

[22] Filed: Aug. 7, 1996

Related U.S. Application Data

[63] Continuation of application No. 08/309,507, Sep. 22, 1994, abandoned.

[30] Foreign Application Priority Data

Feb. 22, 1994 [KR] Rep. of Korea .......................... 94-3111

[51] Int. Cl.$^6$ .............................. G11B 17/22; G11B 17/04
[52] U.S. Cl. .............................. 369/36; 369/178; 369/191
[58] Field of Search .................................... 369/77.1, 194, 369/263, 13, 75.1, 75.2, 36, 178, 191, 192, 77.2; 360/114, 109, 98.06

[56] References Cited

U.S. PATENT DOCUMENTS

| | | | |
|---|---|---|---|
| 4,507,768 | 3/1985 | Ikedo | 369/77.1 |
| 4,527,264 | 7/1985 | d'Alayer de Costemore d'Arc | 369/77.1 |
| 4,589,101 | 5/1986 | Schateman et al. | 369/38 |
| 4,628,489 | 12/1986 | Takamatsu | 369/77.1 |
| 5,103,437 | 4/1992 | Kawakami | 369/36 |
| 5,117,409 | 5/1992 | Shimizu et al. | 369/36 |
| 5,119,354 | 6/1992 | Umesaki | 369/36 |
| 5,402,405 | 3/1995 | Shiomi | 369/77.1 |
| 5,416,753 | 5/1995 | Kanazawa | 369/13 |
| 5,544,148 | 8/1996 | Nakamichi | 369/192 |

FOREIGN PATENT DOCUMENTS

| | | |
|---|---|---|
| 506458 | 9/1992 | European Pat. Off. . |
| 3517004 | 11/1986 | Germany . |
| 4240369 | 1/1994 | Germany . |
| 60-214471 | 10/1985 | Japan . |
| 63-204547 | 8/1988 | Japan . |
| 63-204548 | 8/1988 | Japan . |
| 2143942 | 6/1990 | Japan . |
| 0520764 | 1/1993 | Japan . |
| 2069745 | 8/1981 | United Kingdom . |
| 2159317 | 11/1985 | United Kingdom . |

*Primary Examiner*—Stuart S. Levy
*Assistant Examiner*—Kenneth W. Fields
*Attorney, Agent, or Firm*—Sughrue, Mion, Zinn Macpeak & Seas, PLLC

[57] ABSTRACT

A reduced size disk changer of the type used with a disk magazine storing multiple disks. The disk changer is structured such that a disk can rotate while partially occupying a region of the disk magazine upon recording/reproducing, to thereby reduce the disk changer's size by an amount equivalent to the occupied region.

6 Claims, 3 Drawing Sheets

REDUCED SIZE AUTOMATIC LOADING DISC CHANGER

This application is a continuation of U.S. application Ser. No. 08/309,507 filed Sep. 22, 1994, now abandoned.

BACKGROUND OF THE INVENTION

The present invention relates to a disk changer of the type used with a disk magazine storing multiple disks. More specifically, the disk changer of the present invention is reduced in overall size by allowing a selected disk to operate while occupying part of the disk magazine.

In general, a disk changer comprises a magazine for receiving and storing a plurality of information-bearing media (disks), and a deck mechanism for extracting the selected disk from the magazine and for recording information onto the disk or reproducing information stored on the disk.

However, a magazine and a deck mechanism of this type are typically arranged in roughly the same horizontal plane, such that the required space is at least twice the size of the information-bearing medium.

That is, as shown in FIG. 1, a disk changer 10 comprises a magazine 1 for receiving and storing a plurality of disks 2, and a deck mechanism 6 for extracting one such disk selected from magazine 1 and for recording or reproducing information. The length of the disk changer 10, which included both the magazine reception portion 5 where the magazine 1 is inserted and the deck mechanism 6, is essentially twice that of the disk 2.

SUMMARY OF THE INVENTION

It is an object of the present invention to provide a disk changer of a reduced size having the conventional capability of receiving disks similarly to the conventional size disk changer.

To accomplish the above object of the present invention, there is provided a disk changer comprising:

a plurality of trays for respectively receiving an information-bearing disk;

a magazine for receiving a plurality of trays;

a deck mechanism for recording/reproducing the disk information; the deck mechanism being movable to a location which corresponds to a desired tray in the magazine; and transport means for transferring the selected disk to the recording/reproducing location of the deck mechanism, wherein the recording/reproducing operation takes place with part of the disk partially occupying the tray region.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
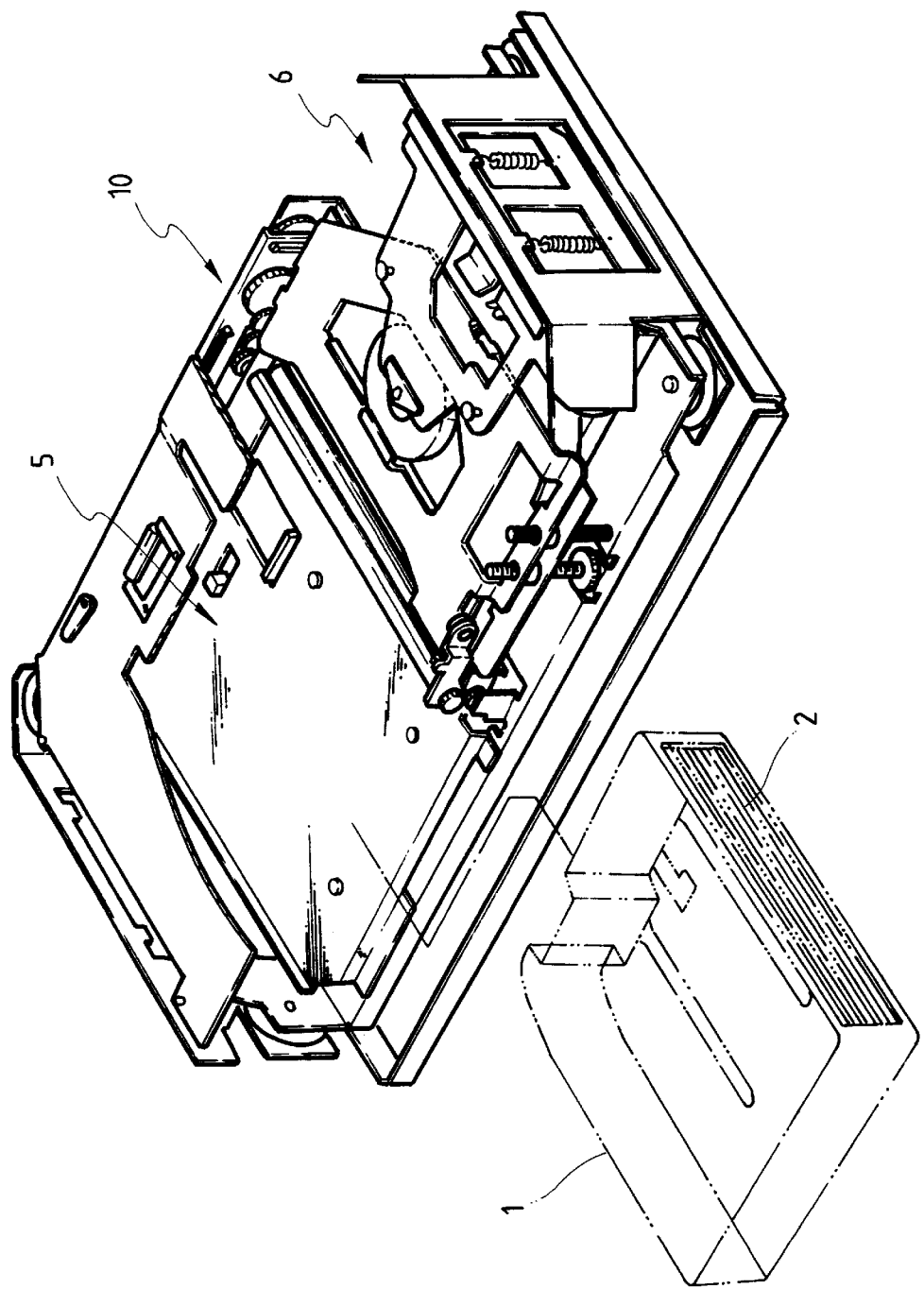
FIG. 1 is a schematic view showing a conventional disk changer.
Figure 2:
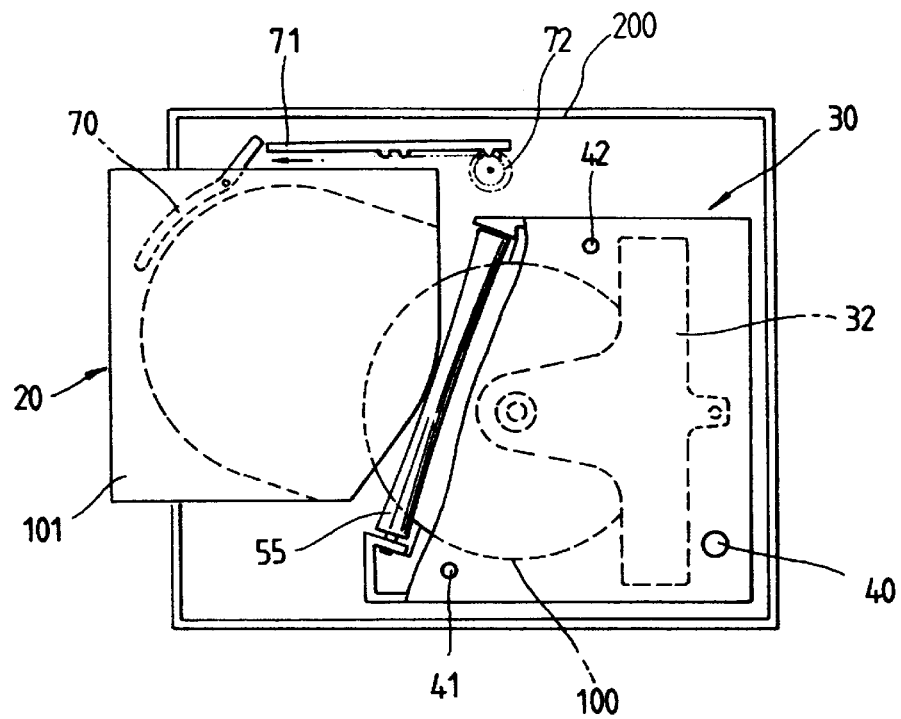
FIG. 2 is a schematic plan view showing a disk changer according to the present invention.
Figure 3:
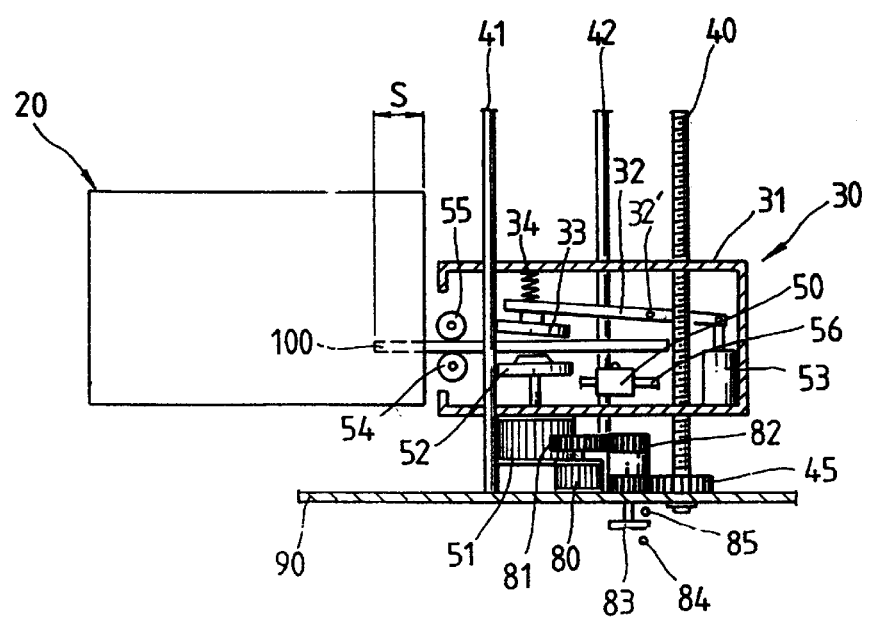
FIG. 3 and FIG. 4 show the operation of a disk changer according to the present invention.
Figure 4:
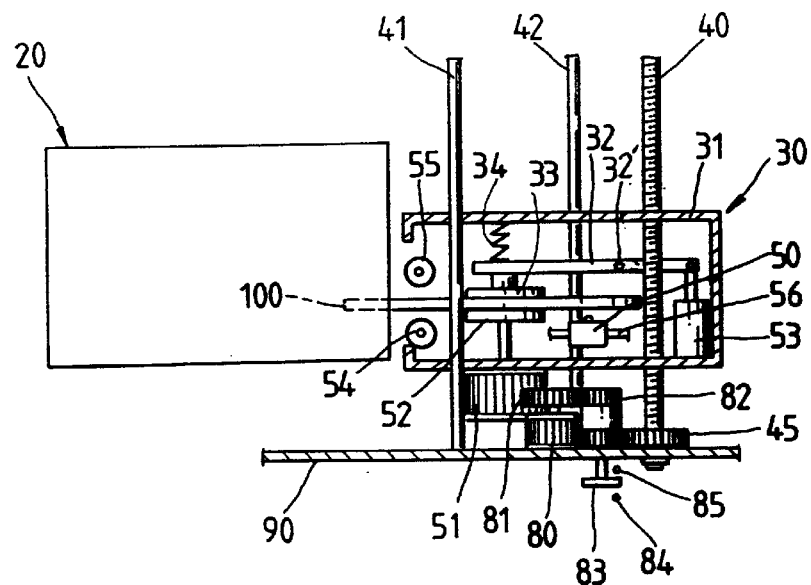

Referring to FIGS. 2 and 3, a disk changer of the present invention includes, inside of a frame 200, a magazine 20 which receives a plurality of trays 101 for respectively receiving a disk 100, and a deck mechanism 30 for recording/reproducing disk information, and which is movable to the location which corresponds to a desired tray 101 among those received in magazine 20. It is desirable that magazine 20 and deck mechanism 30 are arranged diagonally inside of frame 200. In other words, axes extending orthogonally through central portions of the deck mechanism 30 and the deck. mechanism 20, from left to right in FIG. 2, are offset in a widthwise direction of the frame 200, i.e. upwards in FIG. 2. In addition, deck mechanism 30 is installed so as to be vertically movable by a predetermined lifter. A transport means is provided for transferring disk 100 received in tray 101 to a recording/reproducing location of deck mechanism 30. Inside frame 200, a lever member 70 for extracting disk 100 received in tray 101 and a rack 71 for rotating lever member 70 are provided. A gear 72 driven by a motor is meshed with rack 71, to thereby rotate lever member 70.

As shown in FIG. 3, a turntable 52, where disk 100 is loaded, and a spindle motor 51 for driving turntable 52 are provided to a housing 31. A clamp 33 for clamping disk 100 loaded onto turntable 52 is supported by one end portion of a lever 32 rotatably supported by a shaft 32'. The other end portion of lever 32 is connected to a solenoid 53, which can rotate lever 32. The clamp side end of lever 32 is connected to housing 31 by a spring 34. An optical pickup 50 for irradiating tracks of the disk with a light beam while moving in the radial direction of disk 100 is provided to be movable along a guide rail 56. Turntable 52 is installed inside housing 31 at a position adjacent the magazine 20. Accordingly, when disk 100 is seated on turntable 52, part of disk 100 occupies a region S of magazine 20, as shown in FIG. 3.

To move the deck mechanism 30 along a vertical axis, there are provided, guide shafts 41 and 42 and a screw 40 passing through housing 31 and installed on a base 90 of the lower portion of deck mechanism 30, a driving gear 45 installed at the lower portion of screw 40, and a connecting gear 82 and a motor gear 81 interconnecting the motor 80 and the driving gear 45. Thus, screw 40 rotates by the operation of motor 80. The deck mechanism 30 is guided along guide shafts 41 and 42 and moves up and down by the rotation of screw 40. The connecting gear 82 has gears at both ends meshed with motor gear 81 and driving gear 45, respectively.

A slit (not shown) is formed in a rotating plate 83, which coaxially rotates with the connecting gear 82. A light source 84 and a photo-sensor 85 are disposed within the rotation path of the slit, so that the slit periodically permits a light pulse to reach the photo-sensor 85. Thus, the degree of vertical movement of deck mechanism 30 can be monitored by counting the pulses input to photo-sensor 85. Accordingly, deck mechanism 30 can be located at the position corresponding to the desired tray 101 of magazine 20 by counting the input pulses of photo-sensor 85. Alternatively, rotating plate 83 may coaxially rotate with screw 40.

The transport means for loading disk a 100 onto turntable 52 comprises guide rollers 54 and 55 installed between magazine 20 and deck mechanism 30 so as to approach or become separated from each other by a predetermined transport mechanism, and to be rotated by a predetermined power delivery means when approaching each other. Here, guide rollers 54 and 55 are formed as a pin-cushion type (i.e., guide rollers having surfaces that are concave in shape), to thereby protect the recorded surface of disk 100.

Figure 5:
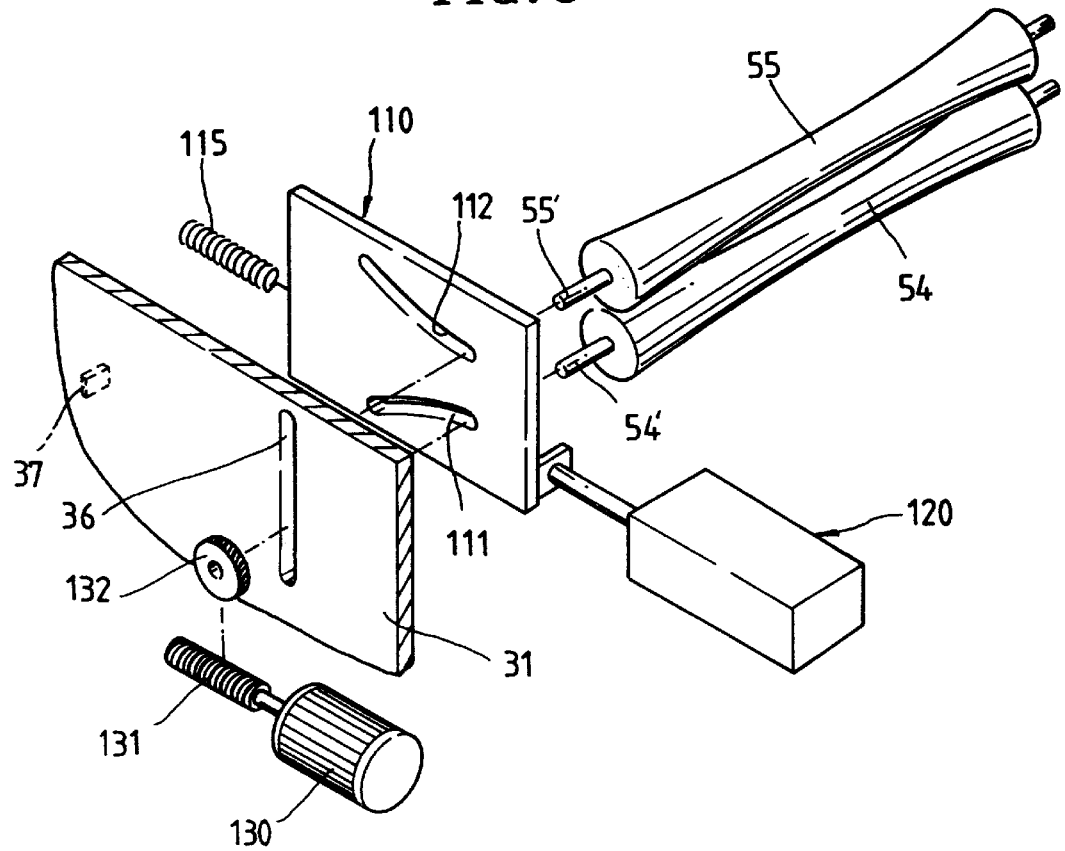
FIG. 5 is a perspective view showing extracted parts of a disk changer according to the present invention.

The transport mechanism will be described with reference to FIG. 5. A vertically elongated slot 36 is formed in a wall of housing 31 so that shafts 54' and 55' of guide rollers 54 and 55 are coupled to housing 31 so as to move vertically along slot 36. A slide plate 110 having sloped slots 111 and 112 is installed inside housing 31 so that shafts 54' and 55' of guide rollers 54 and 55 are respectively coupled to and slid along slots 111 and 112. Only one side of the transport mechanism is shown in FIG. 5, it being understood that the side not shown is the same as the one shown. Thus, it is possible to bring together or separate the two guide rollers 54 and 55 according to the movement of slide plate 110. Here, the shortest distance between sloped slots 111 and 112 is same as the distance between shafts 54' and 55' in the state where guide rollers 54 and 55 approach each other most closely.

A solenoid 120 is connected to one end of slide plate 110 to move the slide plate 110 according to the operation of solenoid 120. At the other end of slide plate 110, a spring 115 is provided to resiliently connect the slide plate to the housing 31, thereby minimizing the vibration of slide plate 110 upon movement. A power delivery means for rotatably operating guide rollers 54 and 55 includes, a worm gear 132 is mounted onto shaft 54' of guider roller 54 and a worm 131 coupled to motor 130 is meshed with worm gear 132, to thereby rotate guider rollers 54 and 55.

The disk changer described above operates as follows. First, when a desired disk 100 is selected, deck mechanism 30 is shifted vertically to the location of the selected disk 100. That is, motor 80 operates to rotate gear 81, connecting gear 82 and driving gear 45. Accordingly, screw 40 rotates, which moves the deck mechanism 30 up or down. The deck mechanism 30 can be moved to the location corresponding to a desired tray 101 of magazine 20 by means of counting the pulses of photo-sensor 85 and stopping the movement when the pulses counted correspond to the desired location of the deck mechanism. In addition, as deck mechanism 30 moves, a clamp 33 is in an unclamped state and guide rollers 54 and 55 are separated from each other.

When deck mechanism 30 stops at the desired location by the proper pulse count, lever member 70 rotates according to the operation of rack 71. As a result, disk 100 is extracted towards deck mechanism 30. At the same time, motor 130 shown in FIG. 5 operates, so that guide rollers 54 and 55 can be meshed with each other. Then, disk 100 (now pulled out) is inserted between the two guide rollers 54 and 55. Due to the pin-cushion shape of guide rollers 54 and 55, only the edges of disk 100 contact the guide rollers, thereby protecting the recorded surface of the disk during the transfer of the disk from the magazine to the recording/reproducing location.

When disk 100 is loaded onto turntable 52, solenoid 53 operates to clamp disk 100 in place. Then, solenoid 120 operates to move slide plate 110 in a direction to separate guide rollers 54 and 55. Then, spindle motor 51 operates to rotate disk 100, and optical pickup 50 moves in the radial direction of disk 100 to perform a recording/reproduction operation.

The disk 100 is loaded onto turntable 52 as follows. Motor 130 operates to rotate guide rollers 54 and 55. At the same time, gear 72 rotates to move rack 71, and also lever member 70 rotates by being connected to rack 71. The disk 100 is pulled out from tray 101 and transported in a horizontal posture by guide rollers 54 and 55. Motor 80 operates to slightly elevate deck mechanism 30 vertically with respect to the surface of disk 100. At this point, disk 100 is loaded onto turntable 52. Then, deck mechanism 30 is raised a little more so as to separate disk 100 from tray 101. Thus, tray 101 does not interfere with disk 100 during rotation of the disk.

After recording/reproducing is finished, the disk 100 is returned to the original location of tray 101 by reversing the above-described operation. First, the spindle motor 51 is stopped and solenoid 53 is operated so as to release clamp 33. After deck mechanism 30 is shifted slightly downward by operating motor 80, guide rollers 54 and 55 approach each other by operating solenoid 120. Then, guide rollers 54 and 55 are rotated by operating motor 130. As a result, disk 100 is returned to tray 101.

A disk changer of the present invention, as described above, is structured in such way that disk 100 can rotate while partially occupying region S of magazine 20 upon recording/reproducing, to thereby reduce the disk changer's size by an amount equivalent to the occupied region S.

What is claimed is:

1. A disk changer comprising:
   a plurality of trays for respectively receiving information-bearing disks;
   a magazine for receiving said plurality of trays;
   a deck mechanism for recording/reproducing information onto and from said disks, said deck mechanism being movable to a location which corresponds to a desired tray among those received in said magazine, said deck mechanism also having a recording/reproduction location at which recording and or reproduction of information takes place;
   said deck mechanism and said magazine being positioned relative to one another on said disk changer such that a disk positioned at said recording/reproduction location has a part thereof remaining within the tray region of said magazine;
   a frame, said magazine and said deck mechanism being arranged in said frame in such a manner that a central orthogonal axis of said magazine is parallel and offset in a widthwise direction of said frame from a central orthogonal axis of said deck mechanism, said central orthogonal axis of said deck mechanism passing through the center of said recording/reproduction location; and
   a transport device comprising a pair of guide rollers which move toward and away from each other to control the ability of said guide rollers to grab and transfer said disks, an elongated vertical slot formed in a wall of said deck mechanism for receiving and guiding shafts of said guide rollers along a vertical axis, a slide plate having a pair of generally horizontally elongated slots diverging away from one another, said guide roller shafts being received respectively in said two elongated slots of said slide plate, and a solenoid connected to one end of said slide plate so as to move said slide plate, whereby the movement of said slide plate causes the guide rollers to move vertically relative to one another.

2. A disk changer according to claim 1, further comprising elevating means for moving said deck mechanism to the location corresponding to the desired tray among those received in said magazine.

3. A disk changer according to claim 2, wherein said elevating means comprising a motor for generating a driving force, a screw driven by said motor and passing through a body of said deck mechanism, and a plurality of guide shafts penetrating said deck mechanism body and along which said body is guided.

4. A disk changer according to claim 1, wherein said guide rollers are formed in a pin-cushion shape so that a recorded surface of the disk can be protected.

5. A disk changer according to claim 1, wherein said guide rollers are installed between said magazine and said deck mechanism; and wherein said transport device further comprises a predetermined power delivery means for rotating said rollers to cause a disk grabbed thereby to move between said magazine position and said recording/reproduction location.

6. A disk changer according to claim 5, wherein said power delivery means comprises a driving gear installed at one end of at least one shaft of said shafts of the guide rollers, and a motor for driving said driving gear.

\* \* \* \* \*